United States Patent
Dohnal

Patent Number: 5,572,234
Date of Patent: Nov. 5, 1996

[54] DISPLAY ELEMENT DENSITY CONVERSION

[75] Inventor: Wayne L. Dohnal, Banks, Oreg.

[73] Assignee: Intel Corporation, Santa Clara, Calif.

[21] Appl. No.: 511,844

[22] Filed: Aug. 7, 1995

Related U.S. Application Data

[63] Continuation of Ser. No. 281,857, Jul. 28, 1994, abandoned, which is a continuation of Ser. No. 763,287, Sep. 20, 1991, abandoned.

[51] Int. Cl.⁶ .................................................. G09G 5/26
[52] U.S. Cl. ........................ 345/132; 395/102; 358/451
[58] Field of Search .................................. 345/127–132, 345/136–138; 358/451, 525, 528; 395/102; 382/299, 300

[56] References Cited

U.S. PATENT DOCUMENTS

| | | | |
|---|---|---|---|
| 4,375,654 | 3/1983 | Evans et al. | 358/260 |
| 4,463,386 | 7/1984 | Goddard et al. | 358/261 |
| 4,628,534 | 12/1986 | Marshall | 382/41 |
| 4,725,892 | 2/1988 | Suzuki et al. | 345/127 |
| 4,742,553 | 5/1988 | Irwin | 382/47 |
| 4,829,587 | 5/1989 | Glazer et al. | 345/127 |
| 4,975,636 | 12/1990 | Desautels | 345/132 |
| 4,979,229 | 12/1990 | Moolenaar | 382/47 |
| 5,065,346 | 11/1991 | Kawai et al. | 345/132 |
| 5,068,905 | 11/1991 | Hackett et al. | 345/132 |
| 5,089,893 | 2/1992 | Iwase | 382/47 |
| 5,153,936 | 10/1992 | Morris et al. | 345/132 |
| 5,175,815 | 12/1992 | Wada | 345/132 |
| 5,185,817 | 2/1993 | Degi et al. | 345/132 |

*Primary Examiner*—Jeffrey Brier
*Attorney, Agent, or Firm*—Blakely, Sokoloff, Taylor & Zafman

[57] ABSTRACT

A method for converting from one display element density to a different display element density. In order to convert from one pixel density to a different density, each pixel in a particular position in a first pixel density must be associated with a pixel or pixels in a corresponding position in a different pixel density. The present invention tracks the cumulative pixel position error introduced for the conversion of each pixel from one input density to a different output density. By tracking a cumulative pixel conversion error, each subsequent pixel conversion is optimized based on the conversion of all prior pixels. In this manner, a more accurate pixel density conversion may be achieved regardless of mid-row density variations. Specifically, the present invention achieves an accuracy of a pixel position error of no more than one-half the distance between the centers of two adjacent output density pixels. The present invention performs this pixel density conversion with low computational overhead, by allowing the output pixel row to be built sequentially as the input pixel row is processed.

33 Claims, 10 Drawing Sheets

|       | COLUMNS |   |   |   |   |   |   |   |   |    |    |    |    |
|-------|---|---|---|---|---|---|---|---|---|----|----|----|----|
|       | 1 | 2 | 3 | 4 | 5 | 6 | 7 | 8 | 9 | 10 | 11 | 12 | 13 |
| 1     | 0 | 0 | 0 | 0 | 0 | 0 | 1 | 0 | 0 | 0  | 0  | 0  | 0  |
| 2     | 0 | 0 | 0 | 0 | 0 | 1 | 1 | 1 | 0 | 0  | 0  | 0  | 0  |
| 3     | 0 | 0 | 0 | 0 | 0 | 1 | 1 | 1 | 0 | 0  | 0  | 0  | 0  |
| 4     | 0 | 0 | 0 | 0 | 0 | 1 | 0 | 1 | 0 | 0  | 0  | 0  | 0  |
| 5     | 0 | 0 | 0 | 0 | 1 | 1 | 0 | 1 | 1 | 0  | 0  | 0  | 0  |
| 6     | 0 | 0 | 0 | 0 | 1 | 1 | 0 | 1 | 1 | 0  | 0  | 0  | 0  |
| 7     | 0 | 0 | 0 | 0 | 1 | 0 | 0 | 0 | 1 | 0  | 0  | 0  | 0  |
| 8     | 0 | 0 | 0 | 1 | 1 | 1 | 1 | 1 | 1 | 0  | 0  | 0  | 0  |
| 9     | 0 | 0 | 0 | 1 | 1 | 0 | 0 | 1 | 1 | 0  | 0  | 0  | 0  |
| 10    | 0 | 0 | 0 | 1 | 0 | 0 | 0 | 0 | 1 | 0  | 0  | 0  | 0  |
| 11    | 0 | 0 | 1 | 1 | 0 | 0 | 0 | 0 | 1 | 1  | 0  | 0  | 0  |
| 12    | 0 | 0 | 1 | 1 | 0 | 0 | 0 | 0 | 1 | 1  | 0  | 0  | 0  |
| 13    | 0 | 1 | 1 | 1 | 0 | 0 | 0 | 0 | 1 | 1  | 1  | 0  | 0  |

PIXEL PATTERN IMAGE DATA

DISPLAY ELEMENT DENSITY CONVERSION

This is a continuation of application Ser. No. 08/281,857, filed Jul. 28, 1994, which is a continuation of application Ser. No. 07/763,287, filed Sep. 20, 1191, both now abandoned.

BACKGROUND OF THE INVENTION

1. Field of the Invention

The present invention relates to the field of computer display systems. Specifically, the field of the invention relates to computer systems for displaying or printing textual, graphical, or other forms of information.

2. Related Art

In the current world of digital computers, visual imagery is often composed of a large number of dots or display elements. These display elements are also called picture elements or pixels. Individual pixels may only be in one of two states: active or inactive (i.e. lighted/unlighted or blackened/transparent or colored/uncolored or on/off). In color displays, pixels are considered to have a color value (i.e. a red, green and blue dot on a color display), however the color dots corresponding to a single pixel may be collectively considered a single pixel. Prior art systems have means for displaying gray scales or color; however, at some level, pixels are either active or inactive. Although individually each pixel is either active or inactive, on a larger scale the pixels combine to form textual, graphical, or other forms of information display or images.

Picture elements (pixels) are used on a wide variety of output devices. Such devices include video display screens, plasma display screens, dot matrix printers, laser printers, facsimile transceivers, and other display or print devices. On each of these display or print devices, pixels are arranged in rows and columns with a predetermined density appropriate for the particular application. Images presented to these output devices for display must be configured with the pixel density in mind in order to preserve the visual integrity of the image. Often, however, configuring an image for the preferred output density is not possible. For example, an image may be configured for one particular output device but displayed or printed on another device. In these situations, a conversion from one pixel density to another is required.

Although some density conversion techniques exist in the prior art, these techniques suffer from a variety of problems. For example, density conversion from a print image to a facsimile image presents a particularly difficult problem. An input print file may contain text data, graphics data, a combination of text and graphics, a combination of different text and graphics densities, and a variety of different text and graphics modes. In spite of these various forms of input image data, any conversion technique must correctly activate pixels for all text and graphics images regardless of the number and order of mode and/or density changes while maintaining the correct size and aspect of the image and all of its components after conversion. Conversion front one pixel density to another must be performed efficiently and quickly in a real-time system. For example, conversion front a printable image to a facsimile image must be performed while a facsimile copy is being transmitted at 9600 baud. Prior art systems have been unable to achieve a high level of conversion accuracy within acceptable performance constraints.

Thus, a better means for converting from one pixel density to another density is required.

SUMMARY OF THE INVENTION

The present invention provides a means and method for converting from one display element density to a different density. It is often desirable or necessary to convert from one pixel density to a different pixel density. Such a conversion may be necessary if an image is both displayed on a video display terminal using one pixel density and output to a printer device using a different pixel density. In order to convert from one pixel density to a different density, each pixel in a particular position in a first pixel density must be associated with a pixel or pixels in a corresponding position in a different pixel density.

The present invention includes means for tracking the pixel position error introduced for the conversion of each pixel front one pixel density to a different pixel density. By tracking a cumulative pixel conversion error, each subsequent pixel conversion is optimized based on the conversion of all prior pixels. In this manner, a more accurate pixel density conversion may be achieved regardless of mid-row density variations. Specifically, the present invention achieves an accuracy of a pixel position error of no more than one-half the distance between the centers of two adjacent output density pixels. Performing this conversion task, therefore, is a matter of computing which output pixel lies closest to each input pixel. The present invention provides a means and method for performing this pixel density conversion with low computational overhead, by allowing the output pixel row to be built sequentially as the input pixel row is processed.

In order to carry out the pixel density conversion process, the present invention maintains an output pixel pointer. This pointer points to the next output pixel to be blackened. Ideally, the output pixel pointer would advance some fraction of a pixel for each input pixel that is processed. In a computer output device, the pixel positions are usually fixed in their location, so it is invalid to move the output pixel pointer to a fractional position.

Another value, the cumulative error counter, is also maintained during the pixel conversion process. This counter represents the horizontal distance between the actual output pixel center, and the desired or optimal position, if fractional horizontal movement were allowed. The cumulative error counter is maintained as a fraction of the spacing between output pixels.

For an input pixel of a given density, two integer values are determined. Each integer value represents a distance that the output pixel pointer must move in order to be positioned at a location in the output pixel row that most closely represents the position of the following input pixel. The two integer values never differ by more than one output pixel position. One of the integer values is too large (i.e. represents movement to a position a bit beyond the optimal position). The other integer value is too small (i.e. represents movement to a position a bit short of the optimal position). One of these integer values is designated as the primary distance. The other integer value is designated as the secondary distance. The primary distance is used in a primary conversion process. The secondary distance is used in a secondary conversion process. Both the primary and the secondary distance have an associated error value. This error value corresponds to the fractional difference between the number of output pixel positions actually moved, and the number of pixel positions that would be moved if fractional positioning were possible (i.e. movement to the optimal position). When the primary or secondary distance is too large, the corresponding error value is negative. When the primary or secondary distance is too small, the corresponding error value is positive. Because the primary and secondary distances are always separated by a value of one, their corresponding error values are also separated by a value of one. When processing an input pixel, if applying the primary conversion process results in an output pixel position error greater than one-half the distance between output pixels, subsequently applying the secondary conversion process to the same input pixel will be guaranteed to produce an output pixel position error of less that one-half the distance between output pixels. Thus, a stream of input density pixels may be converted to a different output pixel density.

DETAILED DESCRIPTION OF THE PREFERRED EMBODIMENT

The present invention is a means and method for converting from one display element density to a different density in a computer system. In the following description, numerous specific details are set forth in order to provide a thorough understanding of the present invention. However, it will be apparent to those of ordinary skill in the art that these specific details need not be used to practice the present invention. In other circumstances, well known structures, circuits, and interfaces have not been shown in detail in order not to unnecessarily obscure the present invention.

Figure 1:
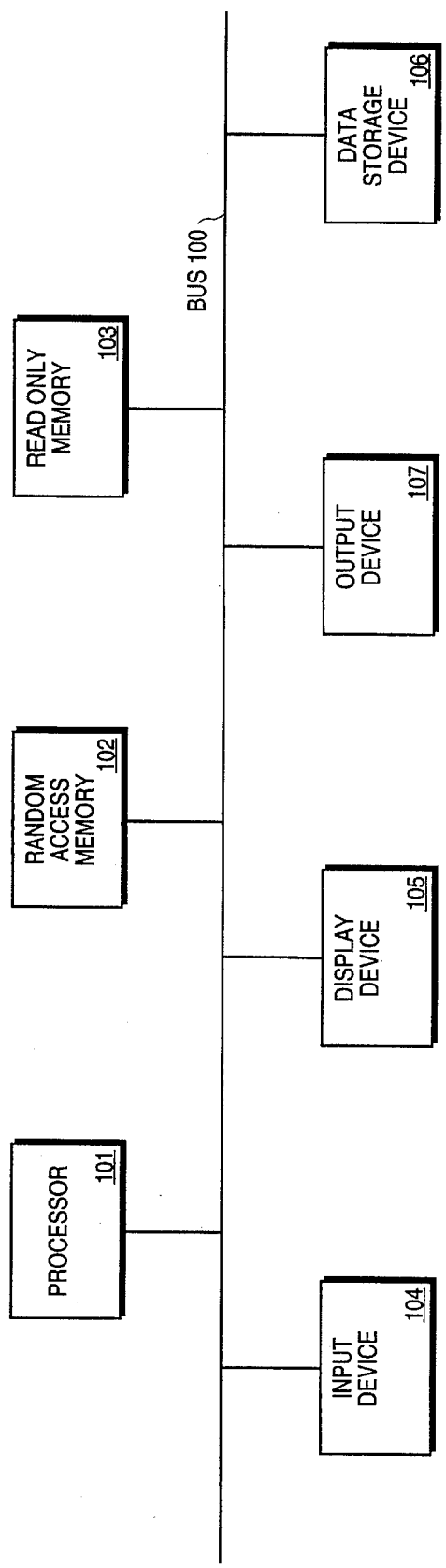
FIG. 1 is a block diagram of the architecture of a typical computer system environment in which the present invention operates.

Referring to FIG. 1, a block diagram of a typical computer system architecture with which the present invention operates is illustrated. It will be apparent to those of ordinary skill in the art, however, that alternative computer system architectures may be employed. In general, such computer systems as illustrated by FIG. 1 comprise a bus 100 for communicating information, a processor 101 coupled with the bus 100 for processing information, and a random access memory device 102 coupled with the bus 100 for storing information and instructions for processor 101. The processing logic of the present invention is typically stored in a device such as random access memory 102 and executed therefrom by processor 101. In addition, a typical computer system may optionally include a read only memory device 103 coupled with the bus 100, an input device 104 such as an alphanumeric input device or a cursor control device coupled to the bus 100 for communicating information and command selections to the processor 101, a display device 105 such as a video display terminal or liquid crystal display device coupled to the bus 100 for displaying information to a computer user, a data storage device 106 such as a magnetic disk and disk drive coupled with the bus 100 for storing information and instructions, and an output device 107 such as a printer or facsimile apparatus coupled to the bus 100 for communicating information to a destination external to the computer system.

Figure 2A:
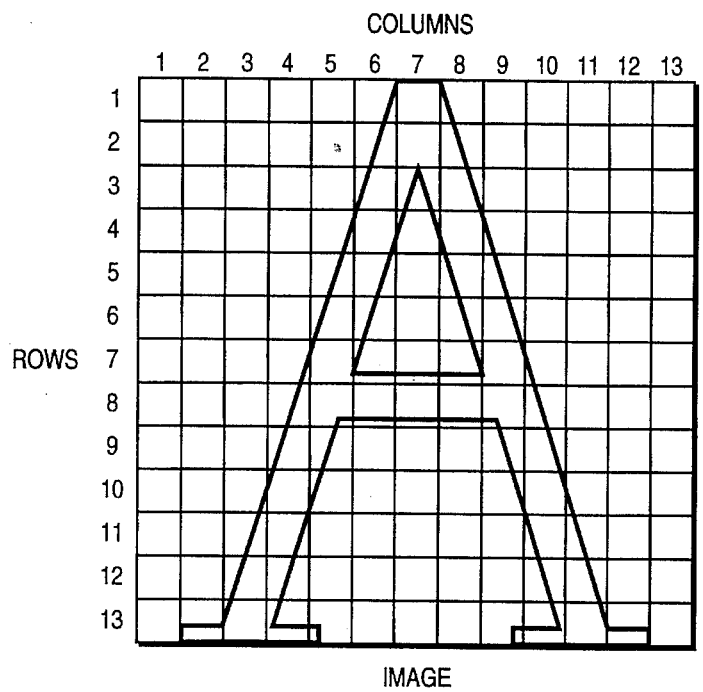
FIGS. 2a, 2b, 3a and 3b illustrate the prior art method of representing images with patterns of pixels in two different pixel densities.
Figure 2B:
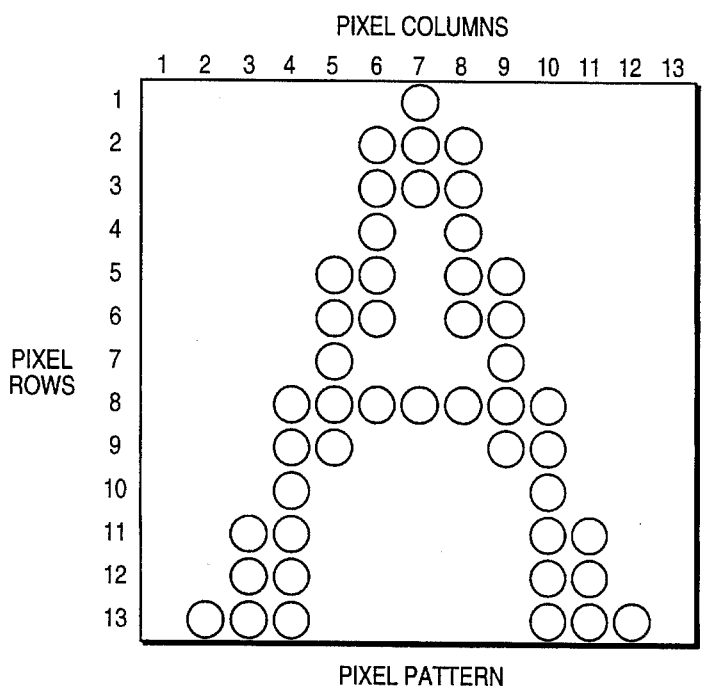

Information and visual images can be presented to a computer user on a visual display screen such as a cathode ray tube (CRT), a hard copy printer (i.e. dot matrix printer, laser printer, or other hard copy print device), facsimile transmitter/receiver device, or other means for producing a visual image display. Digital systems typically produce such visual displays by arranging an array of display elements in a row and column arrangement or pixel pattern on the visual portion or printable surface area of an output device. An example of an image and its associated pixel pattern is illustrated in FIGS. 2a and 2b. These display elements, also known as picture elements or pixels, can be independently illuminated in patterns corresponding to the desired output image. In this manner, textual information, graphical information, or other forms of information and imagery may be presented on a display or print output device. Techniques for creating and displaying visual images in this fashion are well known to those of ordinary skill in the art.

Figure 3A:
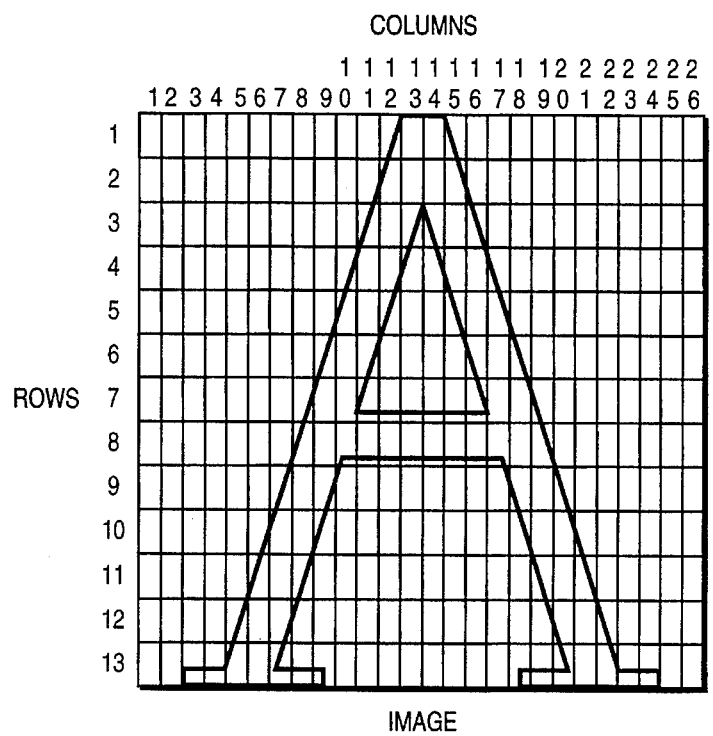
Figure 3B:
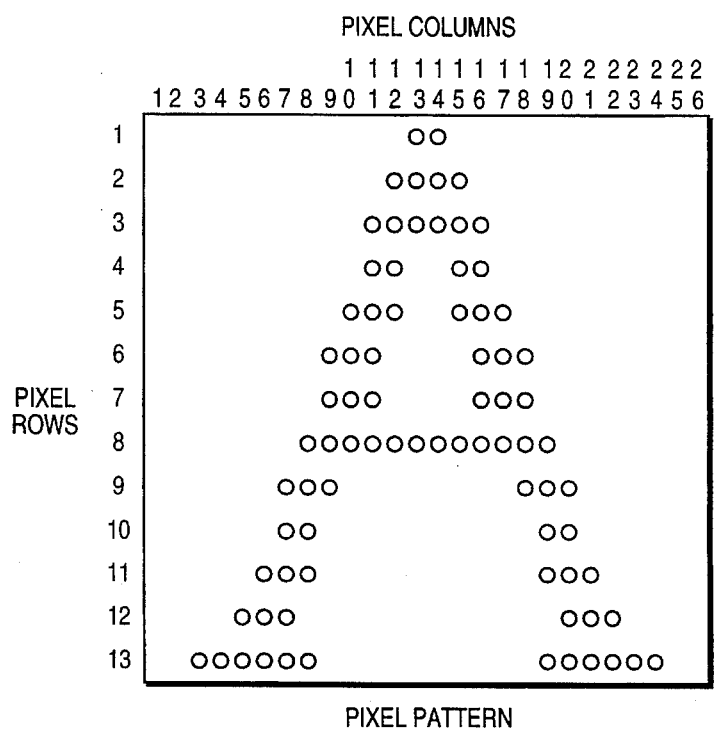
Figures 4A, 4B:
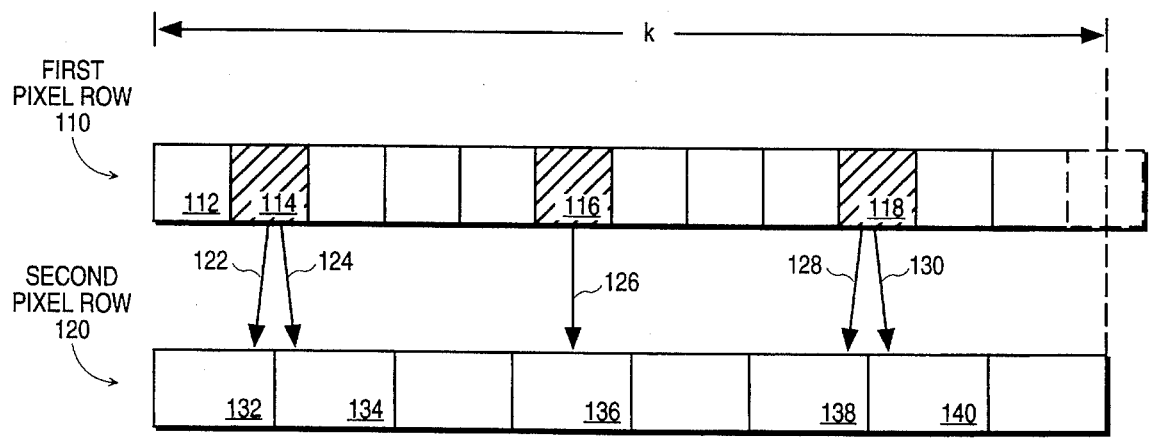
FIG. 4a illustrates the prior art data image associated with a pixel pattern.
FIG. 4b illustrates a row of pixels in two different densities.

Pixel patterns are arranged in various densities depending upon the output device being used and the image resolution desired. Referring to FIGS. 3a and 3b, the same image illustrated in FIG. 2a is again shown in FIG. 3a, except that the number of pixels in each row has been doubled. This increased pixel density is shown in the corresponding pixel pattern illustrated in FIG. 3b. FIG. 4a illustrates a data image associated with the pixel pattern of FIG. 2b. It will be apparent to those skilled in the art that many other arrangements and densities of pixels are possible.

Referring now to FIG. 4b, one row of pixels 110 is illustrated. Such a row 110 may correspond to a single row of pixels from either pixel pattern of FIGS. 2b or 3b. Pixel row 110 is comprised of a plurality of pixels. Several pixels 112, 114, 116, and 118 are shown as a part of pixel row 110. It will be apparent to those of ordinary skill in the an that pixel row 110 may be comprised of any number of pixels in the horizontal dimension. Similarly, other rows of pixels not shown may be configured above and below pixel row 110 to produce a matrix of display elements in a row and column arrangement such as the patterns illustrated in FIGS. 2b and 3b. It will be understood by those of ordinary skill in the art that empty space or gaps may be present between each of the pixels illustrated in pixel row 110. It will be further understood by those skilled in the art that the pixels themselves may be any shape such as rectangular, circular or other shape.

Each of the pixels illustrated in pixel row 110 may be in either an active or an inactive state. On a display output device such as a video display terminal, an active pixel is a lighted pixel and an inactive pixel is an unlighted pixel. Active (i.e. lighted) pixels on such devices may be displayed in a variety of different colors. On hard copy printer devices, such as dot matrix printers, laser printers, or facsimile machines, active pixels are typically displayed as a fully blackened or colored regions such as pixels 114, 116, and 118 illustrated in FIG. 4b. Inactive pixels on print devices do not have any black or colored pigment applied to any portion of the pixel region. Such an inactive pixel 112 is displayed in FIG. 4b. It will be apparent to those skilled in the art that the rectangular pixels illustrated in FIG. 4b may equivalently be implemented as non-rectangular or circular shapes. Typically, however, each pixel is of a uniform size. In the example of FIG. 4b, the pixel size illustrated for each pixel of pixel row 110 is indicated by the area within each rectangular pixel region. The area of each pixel is predetermined depending upon the type of output device used and the image resolution desired. The size of each pixel and the spacing between each pixel determines the density of pixels in each pixel row. Pixel density is defined herein as the number of pixels per unit length k of available display screen or print page space as shown in FIG. 4b. In the example of FIG. 4b, the pixel density of pixel row 110 is 12.5 pixels/k.

A different pixel density may be used on an alternative output device or an output device using a different image resolution. Such a different pixel density is shown in FIG. 4b as pixel row 120. In the example of FIG. 4b, pixel row 120 has a pixel density of 8 pixels/k. It will be apparent to those skilled in the art that other pixel densities for both pixel row 110 and pixel row 120 may equivalently be used with the techniques described herein.

It is often desirable or necessary to convert from one pixel density such as pixel row 110 to a different pixel density such as pixel row 120. Such a conversion may be necessary if an image is both displayed on a video display terminal using one pixel density and output to a printer device using a different pixel density. Similarly, a conversion is necessary when an image or document is both sent to a printer device using one pixel density and sent to a facsimile using a different pixel density. It will be apparent to those skilled in the art that many other situations give rise to the need for converting from one pixel density to a different pixel density.

In order to convert from one pixel density to a different density, each pixel in a particular position in a first pixel density must be associated with a pixel or pixels in a corresponding position in a different pixel density. Referring again to FIG. 4b, pixel 114 in pixel row 110 is an example of an active pixel in a first pixel density. In order to convert from the density of pixel row 110 to an output density of pixel row 120, active pixel 114 must be associated with a pixel or pixels in pixel row 120 corresponding to the position of pixel 114 in pixel row 110. Two such corresponding pixels 132 and 134 in pixel row 120 correspond to the position of pixel 114 in pixel row 110. A pixel density conversion operation must therefore determine which of pixels 132 or 134 (or possibly both pixels 132 and 134) must be activated in order to maintain image integrity in the new pixel density of pixel row 120. It will apparent that a certain amount of error in the converted image is inevitable; because, a pixel in pixel row 120 exactly corresponding to the position of pixel 114 in pixel row 110 is not available. Such an error is somewhat reduced in the situation of pixel 116 where a more direct correspondence between the position of pixel 116 in pixel row 110 exists at pixel 136 in pixel row 120.

Pixel position errors may occur at any position along pixel row 110 such as the error again present at pixel 118 in pixel row 110. In prior art systems, pixel position errors typically increase as a pixel row is processed from left to right. Pixel position errors are exacerbated by the presence of multiple pixel densities on a single pixel row. Multiple densities on a single pixel row may occur if different character fonts are mixed on a single line, text and graphics are mixed on a single line, or explicit mode or density changes are specified using print or graphics commands available in many output devices. When converting from one pixel density to a different density therefore, it is generally not possible to exactly match the desired pixel position or pixel size. Some degree of error is always introduced. The resulting pixel will either be a little too large or a little too small and a little bit out of position. When considering a single pixel, this error may be hardly detectable or significant. Small, barely detectable positioning errors for each pixel can accumulate, however, using prior art methods to produce significant errors over the entirety of a pixel row. Even a single pixel positioning error can ruin a graphics image. Prior art systems have been unable to adequately control the level of error produced when converting from one pixel density to a different density, especially when a single line of pixels uses several different pixel densities.

The present invention includes means for tracking the pixel position error introduced for the conversion of each pixel from one pixel density to a different pixel density. By tracking a cumulative pixel conversion error, each subsequent pixel conversion is optimized based on the conversion of all prior pixels. In this manner, a more accurate pixel density conversion may be achieved regardless of mid-row density variations. Specifically, the present invention achieves an accuracy of a pixel position error of no more than one-half the distance between the centers of two adjacent output density pixels.

Figure 5A:
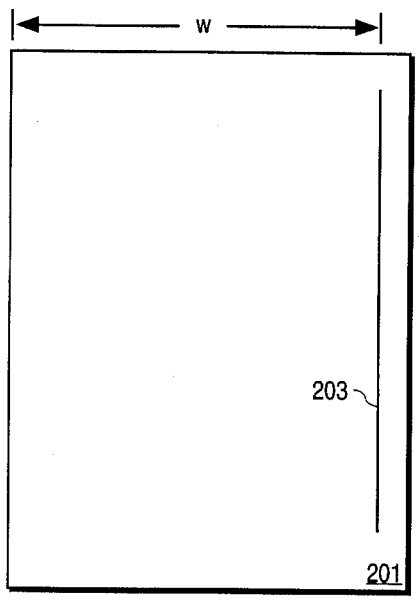
FIGS. 5a–d illustrate examples of various images upon which a pixel conversion is performed.
Figure 5B:
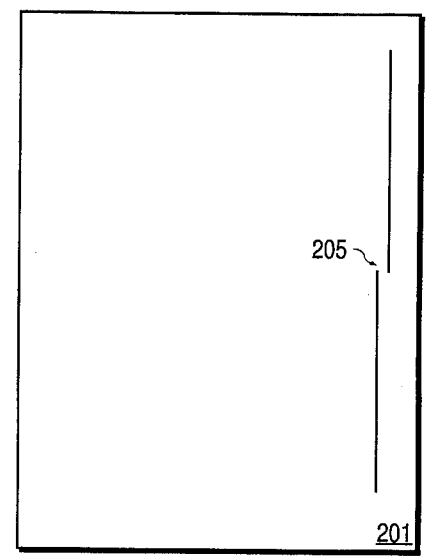
Figure 5C:
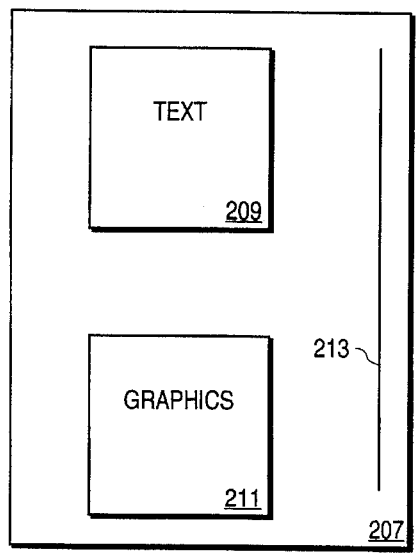
Figure 5D:
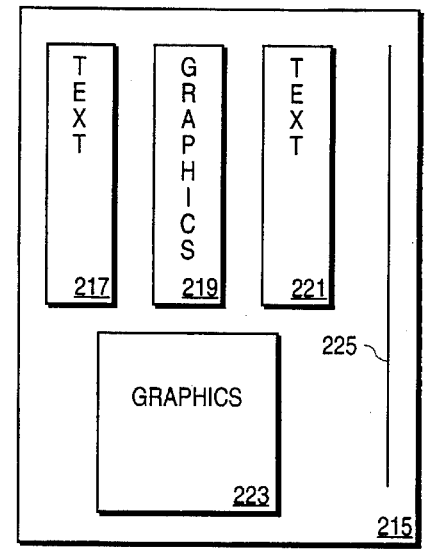
Figure 6:
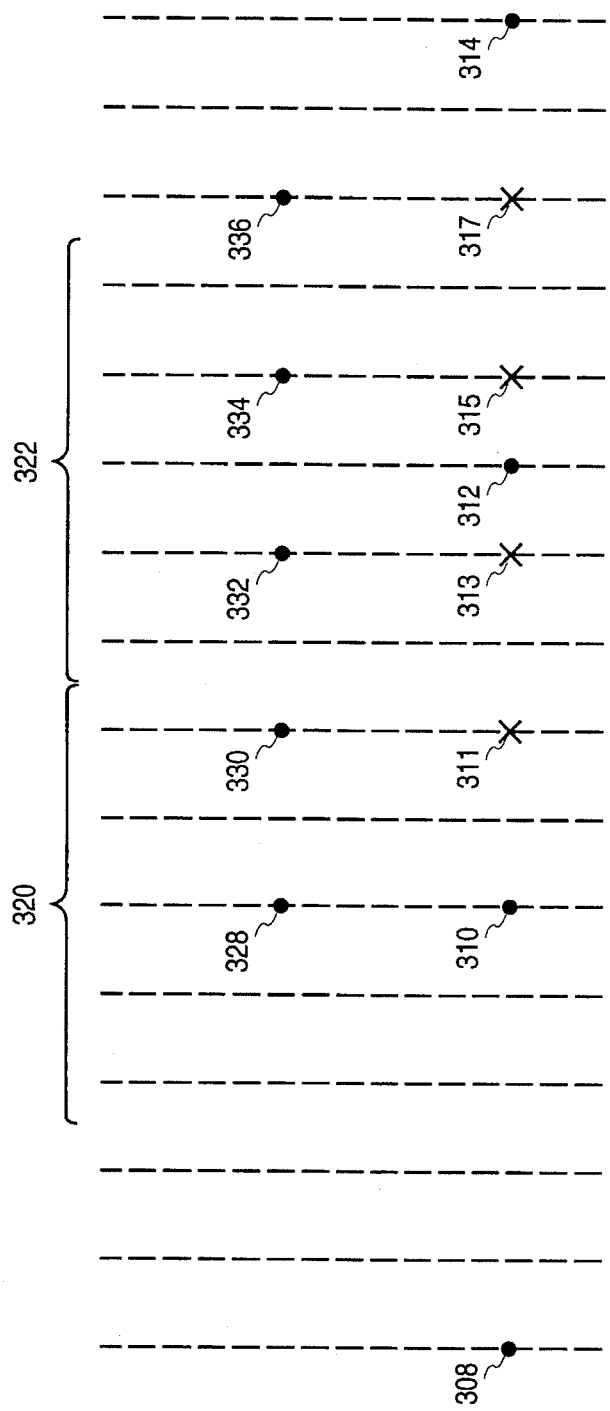
FIG. 6 illustrates an example of a pixel density conversion from a high density pixel format to a low density pixel format.
Figure 7:
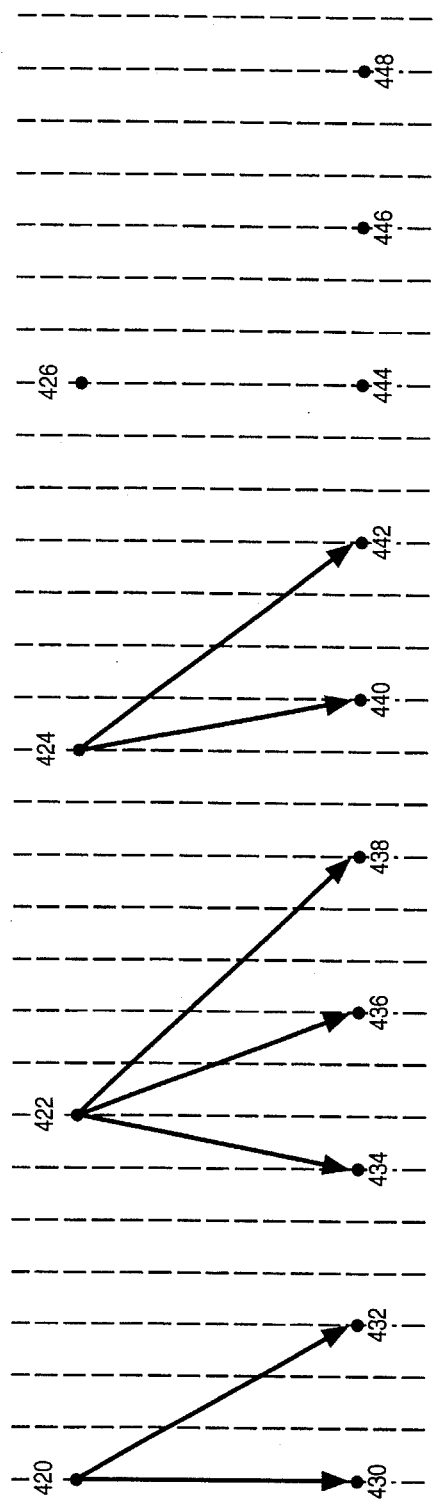
FIG. 7 illustrates an example of a pixel density conversion from a low density pixel format to a high density pixel format.
Figure 8:
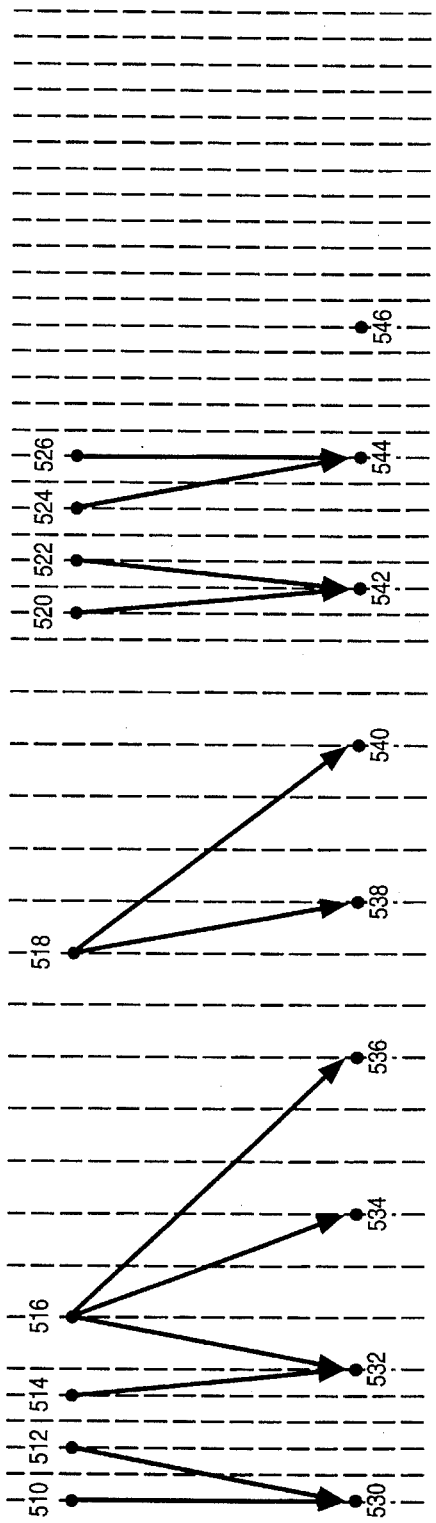
FIG. 8 illustrates an example of a pixel density conversion with multiple types of input pixel densities.

Referring now to FIGS. 5a–d, and FIGS. 6–8, several examples of pixel density conversion using the present invention are illustrated. FIGS. 5a–d illustrate examples of various images upon which a pixel conversion is performed. FIG. 6 illustrates an example of a pixel density conversion from a high density pixel format to a low density pixel format. FIG. 7 illustrates an example of a pixel density conversion from a low density pixel format to a high density pixel format. FIG. 8 illustrates an example of a pixel density conversion with multiple types of input pixel densities. These Figures are fully described in the sections below.

Following English-language conventions, computer output devices generally build images from the left side to the right side of a page, starting at the top of the page and working toward the bottom. The present invention is designed to work on horizontal rows of pixels, one row at a time. Because computers tend to generate these pixel rows starting at the left of the input page, the present invention reads an input row of pixels, one pixel (or character, if in a text mode) at a time, starting at the left, and generates a new row of pixels (in a different pixel density) one or more pixels at a time, also starting at the left side of the page. The pixel conversion process is responsible for correct placement of the darkened (or blackened) pixels in the pixel row that it generates.

FIG. 5a illustrates a simple example of a graphics image that can be used to demonstrate the requirements of the conversion process. The example is an 8½"×11" page 201, with a single vertical line 203 positioned "w" inches from the left edge of the page 201. In the input data to the conversion process, the line 203 consists of one blackened pixel at the same position for each horizontal row of pixels that makes up the page 201. There are three tasks that the conversion process must perform efficiently for its output image to be correct: (1) The line 203 must be in the correct position on the page 201, (2) the line 203 must be the correct width, and (3) the line 203 must be straight. The first requirement does not need to be met perfectly in an absolute sense. If the line 203 is a few hundredths of an inch too far to the right or to the left, the error will not be noticeable. The second requirement is met simply by choosing a number of blackened pixels in the output density that most closely approximates the pixel size in the input density. The third requirement is absolute. The output pixels in the output density must be blackened in exactly the same position for each horizontal row of pixels or the error will be clearly noticeable. FIG. 5b illustrates (in an exaggerated scale) the result of a one-place pixel position shift 205 that occurred half-way down the page 201. A shift of even 1/300 of an inch is clearly noticeable. Such a pixel position shift is caused by inconsistencies in the way that pixel positions are calculated in prior art systems for different horizontal rows of pixels. The elimination of these inconsistencies is a main feature of the present invention. A secondary feature is that the computational overhead used to implement the present invention is very low.

It may not be clear why position shifts such as those described above should occur. A computer program can generate the image in FIG. 5a in two different ways: (1) the program can generate 10 w space characters (10 characters per inch multiplied by "w" inches) followed by a graphic image of a one-pixel wide vertical line segment, for every print line on the page 201, or (2) the program can generate a w-inch long segment of non-blackened pixels, followed by one blackened pixel, for every horizontal line of pixels on the page 201. The result from both techniques would be identical.

Referring now to FIG. 5c, the page example of FIG. 5a has been enhanced to include a block 209 of text on the top half of the page 207, and a graphics image 211 on the bottom of the page 207. The computer program can use the first technique from above, substituting the desired text for the space characters, to generate the top half of the page 207. Similarly, the program can use the second technique, blackening the graphics pixels as needed, to generate the bottom half of the page 207. The vertical line 213, in this example, would be correctly displayed. Performing the pixel density conversion for text, however, presents different problems than those encountered for graphics images. In the prior art, the pixel conversion of text and graphics images is typically performed by different processes. A computer program may generate a vertical line exactly "w" inches from the left edge of the paper; but, in a different output density, there probably will not be a pixel available at exactly the same position in the output density. The conversion processes must choose to shift the output pixel position slightly to the right, or slightly to the left. If the text conversion process shifts one way, and the graphics process shifts the other, the line will be broken as shown in FIG. 5b. Careful design of the conversion processes could solve this problem however, the problem is actually more complex.

FIG. 5d illustrates a more complex example where the top half of a page 215 includes a vertical segment of text 217, followed by graphics image 219, followed by more text 221. Processing from left to right on the top half of the page 215, text conversion of text block 217 will introduce a certain amount of positioning error. Next, graphics conversion of graphics block 219 will introduce an additional amount of positioning error. Finally, the text conversion of text block 221 will introduce still more pixel positioning error. In prior art systems, this error becomes cumulative and produces unacceptable image distortion. In actual usage, the problem is even more complex than this; because, hard copy output devices typically support several character sizes and several graphics densities, all of which may be intermixed almost randomly along a horizontal image line. Each character size and graphics density in the input pixel format generally uses a different conversion process to map input pixels into the output density. Unless every conversion process uniformly generates and shares positioning information with every other conversion process, errors will occur. A broken vertical line as in FIG. 5b is one symptom of such an error. The present invention provides a convention for any number of conversion processes to generate and share this positioning information.

Referring now to FIG. 6, a high density to low density pixel conversion example using the present invention is illustrated. The example includes input density pixels 328, 330, 332, 334, and 336, output density pixels 308, 310, 312, and 314, and regions 320 and 322. Region 320 begins midway between output pixels 308 and 310, and ends midway between output pixels 310 and 312. Region 322 begins midway between output pixels 310 and 312, and ends midway between output pixels 312 and 314. On an output device, pixels have a finite size and shape. The present invention deals only with the center position of each pixel; thus, pixels are represented in the examples illustrated herein only by their center points. The present invention requires that all output pixels are evenly spaced. In FIG. 6, the input pixels are also evenly spaced; but, this is not a requirement of the present invention. Except when the input pixel is located at the extreme left end of a pixel row, the input pixel cannot be assumed to be positioned at the same horizontal location as an output pixel. Thus, in the general case, the center of an input pixel will be positioned somewhere between the centers of two output pixels. The purpose of the present invention, in this example, is to locate an output density pixel whose center is closest to the center of a blackened input pixel. Thus, a blackened input pixel 330, or any input pixel in region 320, will cause output pixel 310 to be blackened. Similarly, blackened input pixels 332 and 334, in region 322, will cause output pixel 312 to be blackened. Performing this task, therefore, is a matter of computing which output pixel lies closest to each input pixel. The present invention provides a means to perform this pixel density conversion with low computational overhead, by allowing the output pixel row to be built sequentially as the input pixel row is processed.

In the example of FIG. 6, the distance between input pixels is two-fifths of the distance between the output pixels. It will be apparent to those skilled in the art that these specific densities are by way of example only; other densities may equivalently be used. The present invention maintains an output pixel pointer, which points to the next output pixel to be blackened. Ideally, the output pixel pointer would advance two-fifths of a pixel for each input pixel that is processed. In a computer output device, however, the pixel positions are usually fixed in their location, so it is invalid to move the output pixel pointer to a fractional position.

Another value, the cumulative error counter, is also maintained during the pixel conversion process of the present invention. This counter represents the horizontal distance between the actual output pixel center, and the desired or optimal position, if fractional horizontal movement were allowed. The cumulative error counter is maintained as a fraction of the spacing between output pixels.

For an input pixel of a given density, two integer values are determined by the present invention. Each integer value represents a distance that the output pixel pointer must move in order to be positioned at a location in the output pixel row that most closely represents the position of the following input pixel. The two integer values never differ by more than one output pixel position. One of the integer values is too large (i.e. represents movement to a position a bit beyond the optimal position). The other integer value is too small (i.e. represents movement to a position a bit short of the optimal position). One of these integer values is designated as the primary distance. The other integer value is designated as the secondary distance. The primary distance is used in a primary conversion process. The secondary distance is used in a secondary conversion process.

Both the primary and the secondary distance have an associated error value. This error value corresponds to the fractional difference between the number of output pixel positions actually moved, and the number of pixel positions that would be moved if fractional positioning were possible (i.e. movement to the optimal position). When the primary or secondary distance is too large, the corresponding error value is negative. When the primary or secondary distance is too small, the corresponding error value is positive. Because the primary and secondary distances are always separated by a value of one, their corresponding error values are also separated by a value of one. When processing an input pixel using the present invention, if applying the primary conversion process results in an output pixel position error greater than one-half the distance between output pixels, subsequently applying the secondary conversion process to the same input pixel will be guaranteed to produce an output pixel position error of less that one-half the distance between output pixels.

Referring again to FIG. 6, the pixel density conversion process of the present invention, described above, is applied to the example in Figure 6. Assume that the next input pixel to be processed is pixel 328, and that the output pixel pointer points to output pixel 310. Because these two pixels are exactly aligned vertically, the horizontal error will be zero. Thus, in this example, the initial cumulative error is 0.0.

In processing input pixel 328, the pixel density conversion process considers the position of the next input pixel (i.e. pixel 330 in this example) and the distance that the output pixel pointer must be advanced to be positioned closest to the position of pixel 330. The output pixel pointer may be advanced by either the primary distance or the secondary distance. In this case, the primary distance is zero; because, output pixel 310 is one of two output pixels, pixel 312 being the other, that most closely represent the position of the input pixel 330. Because the output pixel pointer is already positioned at pixel 310, the output pixel pointer will not need to move at all for a primary distance of zero. The secondary distance is the distance to advance the output pixel pointer to the other closest output pixel (pixel 312). Thus, in this example, the secondary distance is one.

The primary conversion process is first applied. Using the primary conversion process, the output pixel pointer is advanced by the primary distance (zero, in this case), and the output pixel position error value is computed. If fractional movement of the output pixel pointer was allowed, movement from output pixel 310 to point 311 would be optimal. The output pixel position error is the ratio between the distance to the optimal position and the distance between output pixels. Thus, the output pixel position error, in this example, is 2 (the distance from pixel 310 to point 311) divided into 5 (the distance from output pixel 310 to output pixel 312) or 0.40 (all values are rounded to two fractional digits in the examples provided herein). The total cumulative error will be the previous total cumulative error (zero, in this case) plus the output pixel position error computed in the primary conversion process (0.40), for a total cumulative error of 0.40. Because this error is less than one-half the distance from output pixel 310 to output pixel 312, the values computed in the primary conversion process are retained and the secondary conversion process is not needed. If pixel 328 is blackened, as it is in this case, the output pixel o at the output pixel pointer ( pixel 310) is blackened. The output pixel pointer is advanced by the primary distance or zero positions, the new cumulative error is retained as 0.40, and the next input pixel (pixel 330) is obtained.

When input pixel 330 is processed, the distance that the output pixel pointer must be advanced to be positioned closest to the position of the next input pixel (pixel 332) is considered. In this case, the primary distance is again zero and the secondary distance is again one. The primary conversion process is first applied. The output pixel position error, in this case, is 4 (the distance from pixel 310 to point 313) divided into 5 (the distance from output pixel 310 to output pixel 312) or 0.80. Because this error is larger than one-half the distance from output pixel 310 to output pixel 312, the secondary conversion process is applied instead.

Using the secondary conversion process, the output pixel pointer is advanced by the secondary distance (one, in this case), and the error applied in the secondary conversion process for the example of FIG. 6 is −0.60. For the pixel densities in the example of FIG. 6, the primary conversion error is 0.40 and the secondary conversion error is −0.60. If fractional movement of the output pixel pointer was allowed, negative movement from output pixel 312 to point 313 would be optimal. Thus, the total cumulative pixel position error, in this example, is −1 (the distance from pixel 312 to point 3 13) divided into 5 (the distance from output pixel 310 to output pixel 312) or −0.20. The total cumulative error is derived by computing the sum of the previous total cumulative error (0.40, in this case) plus the output pixel position error generated in the secondary conversion process (−0.60), for a total cumulative error equal to −0.20. Because this error is less than one-half the distance from output pixel 310 to output pixel 312, the values computed in the secondary conversion process are retained. If input pixel 330 is blackened, the output pixel at the current output pixel pointer (310) is blackened. The output pixel pointer is advanced one place to output pixel 312, and the new cumulative error becomes −0.2.

Similarly, when processing input pixel 332, the primary conversion process is used. The output pixel pointer does not advance, and the new cumulative error becomes 0.2 (corresponding to the distance between output pixel 312 and point 315). When input pixel 334 is processed, the primary conversion process results in an error of 0.60 (corresponding to the distance between output pixel 312 and point 317). In this case, the secondary conversion process is used; because, the primary conversion yielded an error greater than 0.5. The new cumulative error using the secondary conversion process becomes −0.40. The output pixel pointer is advanced one place so that input pixel 336 will affect the subsequent output pixel. Using this technique, an input density pixel will always affect the closest output density pixel.

The above example illustrates a case where the number of output density pixels that are blackened to represent a blackened input density pixel is not necessarily equal to the movement of the output pixel pointer. Specifically, this example includes instances where one output pixel is blackened, but the output pixel pointer is not moved. The purpose served, in this case, is to assure that a thin black line, possibly as small as one input pixel wide, is not dropped from the lower-density output image.

Referring now to FIG. 7, an example of the operation of the present invention for converting from a low pixel density to a high pixel density format is illustrated. In this situation, more than one output density pixel may be associated with a single input density pixel. In this example, input pixels 420, 422, 424, and 426 are evenly spaced two and ⅓ times o the distance that lies between evenly spaced output pixels 430, 432, 434, 436, 438, 440, 442, 444, 446, and 448. Because processing one input pixel would ideally move the output pixel pointer 2⅓ output pixel positions, the primary conversion process is chosen to advance the output pixel pointer by two output pixel positions, with an error value of ⅓, or 0.33 pixels. The secondary conversion process moves the output pixel pointer by three positions with an error value of −⅔, or −0.67, output pixels.

For the example illustrated in FIG. 7, assume the conversion process starts with input pixel 420, with the output pixel pointer at output pixel 430, and the cumulative error value equal to zero. Applying the primary conversion process to input pixel 420 results in an output pointer movement of two pixels, and a new cumulative error value of 0.33. Because the new error value is less than one-half the distance between two output pixels, the primary conversion process results are retained. Thus, the secondary conversion process is not necessary for this input pixel. If input pixel 420 is blackened, output pixels 430 and 432 are blackened as indicated by the arrows pointing to pixels 430 and 432. The output pixel pointer moves to output pixel 434, and the cumulative error as a result of the primary conversion process is 0.33.

For the next input pixel, applying the primary conversion process to input pixel 422 results in a total cumulative error of 0.67, or more than one-half the distance between output pixels. Therefore, the secondary conversion process is necessary. Using the secondary conversion process, the output pixel pointer is moved three positions to output pixel 40. The old cumulative error of 0.33, plus the secondary conversion process error value of −0.67, results in a new cumulative error value of −0.33. Thus, if input pixel 422 is blackened, output pixels 434, 436, and 438 are blackened as indicated by the arrows pointing to pixels 434, 436, and 38. The output pixel pointer now points to output pixel 440, and the cumulative error as a result of the secondary conversion process is −0.33.

For the next input pixel, applying the primary conversion process to input pixel 424 results in the output pixel pointer being moved two places to output pixel 444, and a new cumulative error value of zero (−0.33+0.33). If input pixel 424 is blackened, output pixels 440 and 442 are blackened. Note that the operation of the conversion process of the preferred embodiment always leaves the output pixel pointer positioned at the output pixel position that is closest to the next input pixel that will be processed in a subsequent iteration.

As illustrated by the two examples above, the difference between the error value produced by the primary conversion process (primary error) and the error value produced by the secondary conversion process (secondary error) is exactly one. Additionally the conversion processes (either primary or secondary conversion processes) are chosen and executed so that both error values (either primary or secondary errors) are always between −1 and 1. It follows, therefore, that in all cases one error value is positive and the other is negative. These attributes are true for any and all examples of the present invention that could be provided. The end results will be identical regardless of which conversion process is chosen as a primary or secondary process for each pixel conversion. In order to make the operation of the present invention more efficient, the selection of which process will be designated the primary conversion process and which will be designated the secondary conversion process is made on the basis of which conversion process will be used more often, as determined on a statistical basis. A simple way to make this designation is to designate as the primary process whichever conversion process produces an error value closest to zero. Because the error values of the two conversion processes have a difference of 1, and one conversion process is positive while the other conversion process is negative, it follows that if the cumulative error produced by one conversion process results in an error of greater than one-half the distance to the desired output pixel pointer position, the other conversion process will be guaranteed to produce a cumulative error of less than one-half the distance to the desired output pixel pointer position.

The above two examples illustrate the operation of the present invention with a single input density. The example of FIG. 6 illustrated a high input density and FIG. 7 illustrated a low input density. Using the present invention, however, there is no constraint on the number of different input pixel densities that may be processed, or the number of times the input density may be changed in the course of processing a single input line of display data. FIG. 8 shows a line of input pixels with two input densities. The high density portion is processed using the pixel relationship from FIG. 6, where there are 2½ input pixels for every output pixel in that example. The low density portion of the line in FIG. 8 is processed using the pixel relationship from FIG. 7, where there is one input pixel for every 2⅓ output pixels in that example.

Referring to FIG. 8, from left to right, an input line consists of three high-density input pixels 510, 512, and 514, followed by two low-density input pixels 516 and 518, followed by four more high-density input pixels 520, 522, 524, and 526. The output line contains nine equally-spaced output pixels 530, 532, 534, 536, 538, 540, 542, 544, and 546. Assume that the cumulative error value is zero as the example begins. High density input pixel 510 is processed first. The primary conversion process is used, meaning that the output pixel pointer is not moved from output pixel 530, and the cumulative error value becomes 0.40, as described in the example of FIG. 6. If input pixel 510 is blackened, the output pixel 530, to which the output pixel pointer is pointing, will be blackened.

High-density input pixel. 512 is processed next. The primary conversion process adds 0.40 to the existing cumulative error value of 0.40 for a total cumulative error of 0.80. Because the 0.80 total is greater than one-half the distance between output pixels, the secondary conversion process is used. The secondary conversion process produces an error value of −0.60. If input pixel 512 is blackened, then output pixel 530 is blackened. The new cumulative error value becomes the sum of the old value of 0.40, plus the new error of −0.60, for a new value of −0.2.

Next, the third high-density input pixel 514 is processed. Applying the primary conversion process results in the output pixel pointer remaining at output pixel 532, and a new cumulative error value equal to 0.2 (i.e. −0.2+0.40). If input pixel 514 is blackened, then output pixel 532 is blackened. The first low-density input pixel 516 is processed next.

Applying the primary conversion process for input pixel 516 in a low pixel density produces an error value of 0.33. This error is added to the current cumulative error value of 0.2 for a total cumulative error value of 0.53. Because this total of 0.53 exceeds one-half the distance between output pixels, the secondary conversion process is used. The secondary conversion process produces an error value of −0.67. Thus, the new cumulative error becomes the sum of the old value of 0.2, plus the newly-computed error of −0.67, for a new cumulative error of −0.47. If input pixel 516 is blackened, three output pixels 532, 534, and 536 are blackened. The output pixel pointer is advanced three positions to output pixel 538.

For low-density input pixel 518, the primary conversion process is used. If pixel 518 is blackened, output pixels 538 and 540 are blackened. The output pixel pointer is moved two positions to output pixel 542. The cumulative error becomes the sum of the old value of −0.47, plus the new error value of 0.33, for a cumulative error result of −0.14.

The next input pixel 520 is at the high-density spacing. Applying the primary conversion process, a primary error value of 0.40 is added to the cumulative error value, for a new cumulative error value of 0.26. If input pixel 520 is blackened, output pixel 542 is blackened. The output pixel pointer remains pointing to output pixel 542.

The next input pixel 522 causes the secondary conversion process to be applied: because, the cumulative error resulting from the primary conversion process (0.40+0.26) results in a cumulative error greater than 0.50. The new cumulative error value becomes the sum of the prior cumulative error value of 0.26, plus the newly computed secondary error value of −0.60, for a total cumulative error of −0.34. The output pixel pointer is advanced to output pixel 544. If input pixel 522 is blackened, output pixel 542 is blackened.

Input pixel 524 causes the primary conversion process to be applied. The cumulative error value becomes the sum of the old cumulative error value of −0.34, plus the newly computed error value of 0.40, for a new cumulative error value of 0.067. If input pixel 524 is blackened, output pixel 544 will be blackened. The output pixel pointer remains at output pixel 544.

The final input pixel in the example of FIG. 8, pixel 526, also causes the primary conversion process to be used; because, the new cumulative error value is less than 0.50. The new cumulative error value becomes the sum of the old cumulative error value of 0.067 plus the newly computed primary error value of 0.40 resulting in a new cumulative error value of 0.47. A blackened input pixel 526 will cause output pixel 544 to be blackened. The output pixel pointer remains at output pixel 544.

As in the prior examples, the first output pixel affected by an input pixel is always the closest output pixel. The present invention guarantees that this will always be true by maintaining an output pixel pointer and error value that is shared by, and compatible with, all input pixel densities that are supported in a given computer system. It will be apparent to those skilled in the art that the present invention operates equivalently well with specific pixel densities other than the specific densities used in the above examples.

OPERATION OF THE PREFERRED EMBODIMENT

The processing logic of the preferred embodiment is operably disposed within random access memory 102 and executed by processor 101 of the computer system illustrated in FIG. 1 and described above. The processing logic of the present invention may equivalently be disposed in a read only memory 103 or other memory means accessible to processor 101 for execution. This processing logic can be a separately compiled or loaded entity or incorporated as part of a larger application or system software package. In either case, a means for activating processing logic of the present invention may be employed using techniques well known to those of ordinary skill in the art. Once activated, the processing logic of the present invention operates in the manner described below.

In addition to processing logic described herein, the present invention uses data stored in several data tables maintained in random access or read only memory. This data, which can be pre-determined or pre-computed, defines conversion values for each of several graphics modes and text fonts. These conversion values include a parameter indicating a number of output density pixels used to represent an input density pixel. The conversion values also include a designation of the primary output pixels and the secondary output pixels along with a number of output density pixels associated with a single input density pixel. Depending upon the graphics mode previously set using a graphics command or the text font previously specified, the appropriate conversion values may be selected from the appropriate data table. For conversion of text data, additional data tables are provided depending upon a mode selection for proportional text spacing or a mode selection of non-proportional text spacing. These data tables used in the preferred embodiment of the present invention are computed for an output pixel spacing of approximately 204 pixels per inch, and are given below. It will be apparent to those skilled in the art that this data may be stored in alternative arrangements while still being used to practice the present invention.

TABLE A

| | | Pixel Conversions for Graphics Modes | | | |
|---|---|---|---|---|---|
| Input Pixels (pixels per inch) | Output Pixels per Input Pixels | Number of Primary Output Pixels | Primary Output Pixel Pointer Movement (Primary Distance) | Number of Secondary Output Pixels | Secondary Output Pixel Pointer Movement (Secondary Distance) |
| 240 | 0.8385 | 1 | 1 | 1 | 0 |
| 144 | 1.3976 | 2 | 1 | 2 | 2 |
| 120 | 1.6771 | 2 | 1 | 2 | 2 |
| 90 | 2.2361 | 2 | 2 | 3 | 3 |

TABLE A-continued

Pixel Conversions for Graphics Modes

| Input Pixels (pixels per inch) | Output Pixels per Input Pixels | Number of Primary Output Pixels | Primary Output Pixel Pointer Movement (Primary Distance) | Number of Secondary Output Pixels | Secondary Output Pixel Pointer Movement (Secondary Distance) |
|---|---|---|---|---|---|
| 80 | 2.5156 | 3 | 3 | 3 | 2 |
| 72 | 2.7951 | 3 | 3 | 3 | 2 |
| 60 | 3.3542 | 3 | 3 | 4 | 4 |

TABLE B

Pixel Conversion for Proportionally-Spaced Text

| Number of Input Pixels | Output Pixels per Character | Primary Output Pixel Pointer Movement (Primary Distance) | Secondary Output Pixel Pointer Movement (Secondary Distance) |
|---|---|---|---|
| (Pica characters) | | | |
| 5 | 8.3854 | 8 | 9 |
| 6 | 10.0625 | 10 | 11 |
| 7 | 11.7395 | 12 | 11 |
| 8 | 13.4166 | 13 | 14 |
| 9 | 15.0937 | 15 | 16 |
| 10 | 16.7708 | 17 | 16 |
| 11 | 18.4479 | 18 | 19 |
| 12 | 20.1250 | 20 | 21 |
| (Expanded Pica characters) | | | |
| 10 | 16.7708 | 17 | 16 |
| 12 | 20.1250 | 20 | 21 |
| 14 | 23.4790 | 23 | 24 |
| 16 | 26.8332 | 27 | 26 |
| 18 | 30.1874 | 30 | 31 |
| 20 | 33.5416 | 34 | 33 |
| 22 | 36.8958 | 37 | 36 |
| 24 | 40.2500 | 40 | 41 |

TABLE C

Pixel Conversion for Non-Proportionally-Spaced Text

| Font Name | Number of Input Pixels | Output Pixels per Character | Primary Output Pixel Pointer Movement (Primary Distance) | Secondary Output Pixel Pointer Movement (Secondary Distance) |
|---|---|---|---|---|
| Pica | 12 | 20.1250 | 20 | 21 |
| Elite | 10 | 16.7710 | 17 | 16 |
| Compressed Pica | 7 | 11.7520 | 12 | 11 |
| Compressed Elite | 6 | 10.0620 | 10 | 11 |
| Expanded Pica | 24 | 40.2500 | 40 | 41 |
| Expanded | 20 | 33.5420 | 34 | 33 |
| Comp-Exp Pica | 14 | 23.5040 | 24 | 23 |
| Comp-Exp Elite | 20 | 20.1250 | 20 | 21 |

Figure 9:
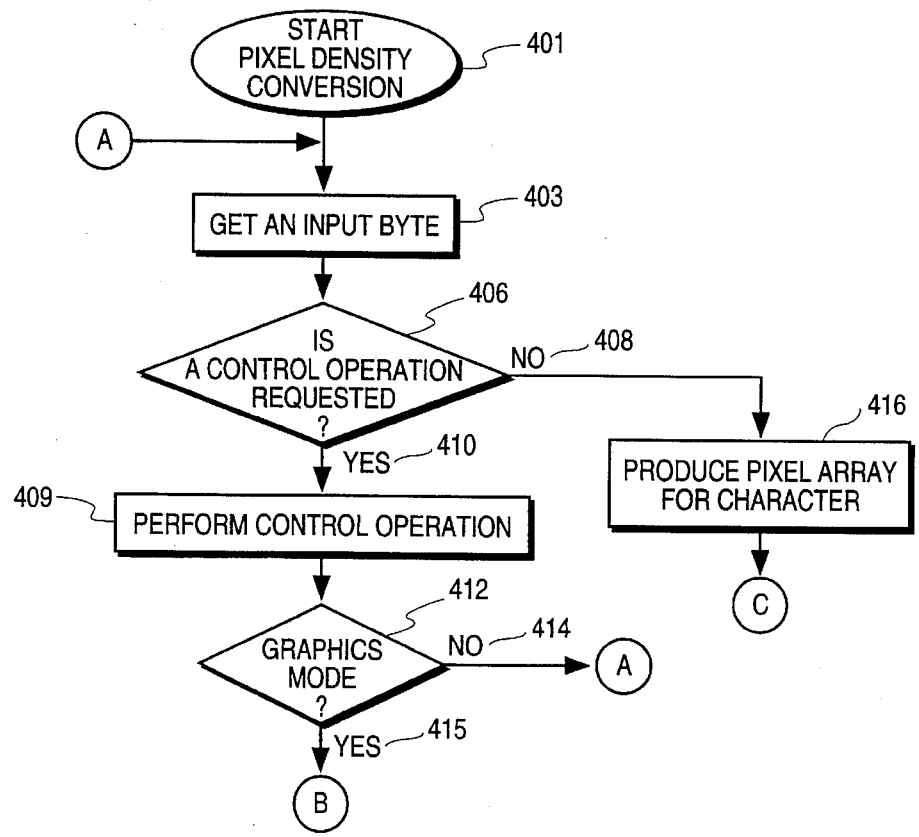
FIGS. 9–11 are flow charts illustrating the processing logic of the present invention.
Figure 10:
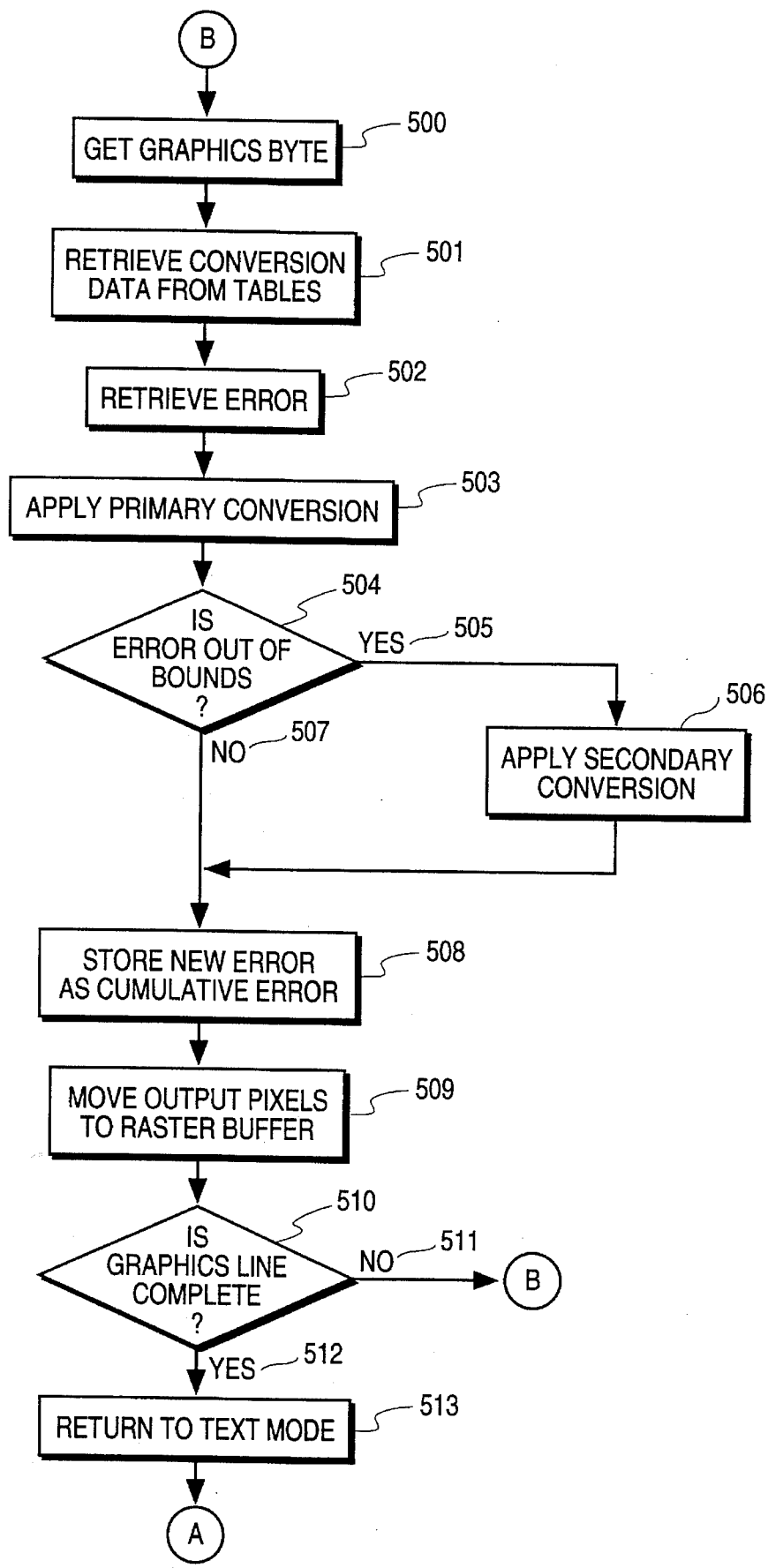
Figure 11:
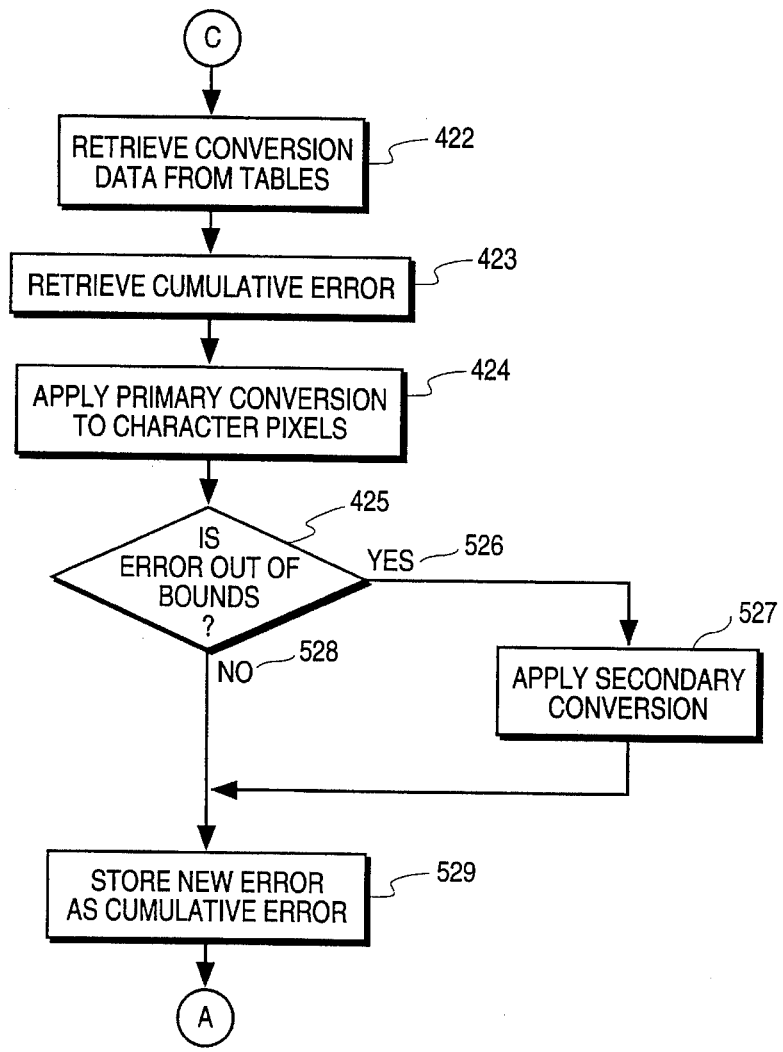

Referring now to FIGS. 9 through 11, flow charts illustrating the processing logic of the present invention as built into a dot-matrix printer emulator are illustrated. Starting in FIG. 9 at the bubble labeled "Start Density Conversion" 401, processing for the preferred embodiment starts at bubble 401 upon activation of the logic of the present invention. A stream of input graphics data or textual data is provided to the processing logic of the present invention. Continuing at the processing block 403, a byte of data is retrieved from the input data stream. If the input byte represents a control operation request, processing path 410 is taken to processing block 409 where the control operation is performed. In the preferred embodiment, control operations include specification of text letter quality, character width, character enhancement modes, italic or page formatting modes, margins, page length, tabs, proportional spacing, entry into a graphics mode, and other operations. For graphics modes, control codes include specification of single, double, or higher density graphics, a specification of print speed, or a specification of special characters. Once the specified operation is performed in processing block 409, if the graphics mode is selected (i.e. the control operation was a request to enter a graphics mode) processing control continues via processing path 415 at the bubble labeled B as shown in FIG. 10. If the graphics mode is not selected (processing path 414) processing control continues at the bubble labeled A as shown in FIG. 9. If in decision block 406, the input byte is not a control operation, text mode is assumed and the input byte is processed as a printable character. A printable character is one holding a value in a specified range of ASCII values associated with printable characters as well known in the art. In order to process a printable character, processing path 408 is taken to processing block 416 where a pixel array for the character is produced and the pixel array is moved to a raster buffer. Next, processing for the character continues at the bubble labeled C as illustrated in FIG. 11.

Referring now to FIG. 11, at the bubble labeled C, conversion data is retrieved from conversion data tables depending upon a previously specified text font and proportional spacing mode (processing block 422). Next, a cumulative error value is retrieved from a global storage location (processing block 423). In the manner described earlier, a primary conversion process is applied to each of the character pixels by adding the new error value to the cumulative error value. If the newly-computed error value is greater than one-half the size of an output pixel, processing path 526 is taken to processing block 527 where the additional step of applying a secondary conversion process is performed. The secondary conversion process uses a secondary distance and an error value designated by an entry in the conversion data table. As described above, either the primary conversion process or the secondary conversion process will produce a difference less than the limiting distance of one-half the distance between two output density pixels. Thus, a new acceptable error value is computed and stored as a new cumulative error in processing block 529 and processing continues at the bubble labeled A as illustrated in FIG. 9.

Referring now to FIG. 10, a graphics byte is retrieved in processing block 500. Such a graphics byte may be one of a stream of graphics bytes as well known and commonly used in the art. Next, conversion data for the appropriate graphics mode is retrieved from data tables in processing block 501. A cumulative pixel position error value is retrieved from a global storage location (processing block 502). In processing block 503, the primary conversion process is applied and a primary error value is added to the cumulative error value. If the resulting cumulative error is out of bounds or beyond the limit of one-half the distance between two output density pixels, processing path 505 is taken to processing block 506 where a secondary conversion process is used. The secondary conversion process uses a secondary distance and an error value from an entry in a conversion data table. As a result of the processing in either processing block 503 or processing block 506, a cumulative error value less than one-half the distance between two output density pixels is determined and stored as a new cumulative error value in a global memory location (processing block 508). Having determined the closest output density pixel to the input density pixel, the output pixels are moved to the raster buffer for display or print in processing block 509. If each of the graphics bytes in the input stream have been processed, processing path 512 is taken where the program is returned to text mode. Processing control is then passed to the bubble labeled A illustrated in FIG. 9 where a new input byte is retrieved. If, however, a graphics input stream has not yet completed, processing path 511 is taken to the bubble labeled B illustrated in FIG. 10 where the next graphics byte in the stream is processed.

Thus, a means and method is described for converting from one display element density to a different density.

Although the present invention has been described herein with reference to a specific embodiment, many modifications and variations therein will readily occur to those skilled in the art. Accordingly, all such variations and modifications are included within the intended scope of the present invention as defined by the following claims.

I claim:

1. In a computer system having at least one output device, said at least one output device having a plurality of picture elements (pixels) for representing at least one image, each pixel having a position on said at least one image, said pixels being arranged in a first density, a method for converting from using said first density to represent said at least one image on a first output device of said at least one output device to using a second pixel density to represent said at least one image on a second output device of said at least one output device, wherein said first output device and said second output device may be the same output device, said method comprising the steps of:

performing a primary conversion on an input pixel from said plurality of pixels arranged in said first density to determine the position of a first output pixel in said second pixel density corresponding to the position of said input pixel in said first pixel density;

determining a primary pixel positioning error of said first output pixel; and performing a secondary conversion on said input pixel to determine the position of a second output pixel in said second pixel density corresponding to the position of said input pixel in said first pixel density, said step of performing a secondary conversion being performed if said primary pixel positioning error is greater than a predetermined limit, said second output pixel being displayed on said second output device of said at least one output device if said secondary conversion is performed otherwise said first output pixel being displayed on said second output device of said at least one output device.

2. The method as claimed in claim 1 further including the steps of:

retrieving a cumulative pixel position error; and applying said cumulative pixel position error to said primary conversion and said secondary conversion.

3. The method as claimed in claim 1 wherein said step of performing a primary conversion further including the step of:

applying a primary pixel positioning error previously determined for a first input pixel to a second input pixel.

4. The method as claimed in claim 1 wherein said step of performing a primary conversion further including the step of:

moving an output pixel pointer by a primary distance.

5. The method as claimed in claim 1 further including a step of obtaining pixel positioning information associated with a currently active graphics or text mode.

6. The method as claimed in claim 1 further including a step of obtaining pixel sizing information associated with a currently active graphics or text mode.

7. The method as claimed in claim 1 wherein said step of performing a secondary conversion further includes the step of:

moving an output pixel pointer by a secondary distance.

8. The method as claimed in claim 7 further including a step of obtaining pixel positioning information associated with a currently active graphics or text mode.

9. The method as claimed in claim 7 further including a step of obtaining pixel sizing information associated with a currently active graphics or text mode.

10. The method as claimed in claim 1 further including a step of saving said primary pixel positioning error in global storage for use in processing a subsequent input pixel.

11. The method as claimed in claim 1 wherein said predetermined limit is a distance equal to half the distance between centers of two output pixels in said second pixel density.

12. The method as claimed in claim 1 wherein said primary pixel positioning error has an associated direction opposite that of a direction associated with a pixel positioning error produced in said secondary conversion step.

13. The method as claimed in claim 1 wherein said step of performing a secondary conversion further including the step of:

determining a secondary pixel positioning error of said second output pixel.

14. The method as claimed in claim 13 wherein said step of performing a secondary conversion further including the step of:

applying said secondary pixel positioning error previously determined for a first input pixel to a second input pixel.

15. The method as claimed in claim 13 further including a step of saving said secondary pixel positioning error in global storage for use in processing a subsequent input pixel.

16. In a computer system having at least one output device, said at least one output device having a plurality of picture elements (pixels) for representing at least one image, each pixel having a position on said at least one image, said pixels being arranged in a first density, a pixel density conversion apparatus for converting from using said first density to represent said at least one image on a first output device of said at least one output device to using a second pixel density to represent said at least one image on a second output device of said at least one output device, wherein said first output device and said second output device may be the same output device, said apparatus comprising:

means for performing a primary conversion on an input pixel from said plurality of pixels arranged in said first density to determine the position of a first output pixel in said second pixel density corresponding to the position of said input pixel in said first pixel density;

means for determining a primary pixel positioning error of said first output pixel; and means for performing a secondary conversion on said input pixel to determine the position of a second output pixel in said second pixel density corresponding to the position of said input pixel in said first pixel density, said means for performing a secondary conversion activated if said primary conversion pixel positioning error is greater than a predetermined limit, said second output pixel being displayed on said second output device of said at least one output device if said secondary conversion is performed otherwise said first output pixel being displayed on said second output device of said at least one output device.

17. The apparatus as claimed in claim 16 further including:

means for retrieving a cumulative pixel position error; and means for applying said cumulative pixel position error to said primary conversion and said secondary conversion.

18. The apparatus as claimed in claim 16 said means for performing a primary conversion further including:

means for applying a pixel positioning error previously determined for a first input pixel to a second input pixel.

19. The apparatus as claimed in claim 16 wherein said means for performing a primary conversion further includes:

means for moving an output pixel pointer by a primary distance.

20. The apparatus as claimed in claim 16 further including means for obtaining pixel positioning information associated with a currently active graphics or text mode.

21. The apparatus as claimed in claim 16 further including means for obtaining pixel sizing information associated with a currently active graphics or text mode.

22. The apparatus as claimed in claim 16 wherein said means for performing a secondary conversion further includes:

means for moving an output pixel pointer by a secondary distance.

23. The apparatus as claimed in claim 22 further including means for obtaining pixel positioning information associated with a currently active graphics or text mode.

24. The apparatus as claimed in claim 22 further including means for obtaining pixel sizing information associated with a currently active graphics or text mode.

25. The apparatus as claimed in claim 16 further including means for saving said primary pixel positioning error in global storage for use in processing a subsequent input pixel.

26. The apparatus as claimed in claim 16 wherein said predetermined limit is a distance equal to half the distance between centers of two output pixels in said second pixel density.

27. The apparatus as claimed in claim 16 wherein said primary pixel positioning error has an associated direction opposite that of a direction associated with a pixel positioning error produced by said means for performing a secondary conversion.

28. The apparatus as claimed in claim 16 wherein said means for performing a secondary conversion further including:

means for determining a secondary pixel positioning error of said second output pixel.

29. The apparatus as claimed in claim 28 wherein said means for performing a secondary conversion further including:

means for applying said secondary pixel positioning error previously determined for a first input pixel to a second input pixel.

30. The apparatus as claimed in claim 28 further including means for saving said secondary pixel positioning error in global storage for use in processing a subsequent input pixel.

31. In a computer system having at least one output device, said at least one output device having a plurality of picture elements (pixels) for representing at least one image, each pixel having a position on said at least one image, said pixels being arranged in a first density and a second density, a method for converting from using said first density and said second density to represent said at least one image on a first output device of said at least one output device to using a third pixel density to represent said at least one image on a second output device of said at least one output device, wherein said first output device and said second output device may be the same output device, said method comprising the steps of:

performing a primary conversion on an input pixel from said plurality of pixels arranged in said first density and said second density to determine the position of a first output pixel in said third pixel density corresponding to the position of said input pixel in said first pixel density and said second density;

determining a primary pixel positioning error of said first output pixel; and performing a secondary conversion on said input pixel to determine the position of a second output pixel in said third pixel density corresponding to the position of said input pixel in said first pixel density and said second density, said step of performing a secondary conversion being performed if said primary conversion pixel positioning error is greater than a predetermined limit, said second output pixel being displayed on said second output device of said at least one output device if said secondary conversion is performed otherwise said first output pixel being displayed on said second output device of said at least one output device.

32. A computer system having at least one output device, the output device having a plurality of picture elements (pixels) for representing at least one image, each pixel having a position on the at least one image, the pixels being arranged in a first pixel density, the computer system programmed to convert from representing the at least one image in the first pixel density on a first output device to representing the at least one image in a second pixel density on a second output device, the computer system including:

means for performing a primary conversion on an input pixel from the plurality of pixels arranged in the first pixel density to determine the position of a first output pixel in the second pixel density corresponding to the position of the input pixel in the first pixel density;

means for determining a primary pixel positioning error of the first output pixel; and means for performing a secondary conversion on the input pixel to determine the position of a second output pixel in the second pixel density corresponding to the position of the input pixel in the first pixel density, the means for performing a secondary conversion activated if the primary pixel positioning error is greater than a predetermined limit, said second output pixel being displayed on said second output device of said at least one output device if said secondary conversion is performed otherwise said first output pixel being displayed on said second output device of said at least one output device.

33. The computer system of claim 31 wherein the first output device and the second output device are the same output device.

* * * * *

UNITED STATES PATENT AND TRADEMARK OFFICE
CERTIFICATE OF CORRECTION

PATENT NO. : 5,572,234
DATED : November 5, 1996
INVENTOR(S) : Wayne L. Dohnal

It is certified that error appears in the above-indentified patent and that said Letters Patent is hereby corrected as shown below:

In column 1 at line 6 delete "Sep. 20, 1191," and insert --Sep. 20, 1991,--

In column 1 at line 60 delete "front" and insert --from--

In column 1 at line 62 delete "front" and insert --from--

In column 1 at line 63 delete "perforated" and insert --performed--

In column 2 at line 20 delete "front" and insert --from--

In column 11 at line 36 delete "pixel 40." and insert --pixel 440.--

UNITED STATES PATENT AND TRADEMARK OFFICE
CERTIFICATE OF CORRECTION

PATENT NO. : 5,572,234
DATED : November 5, 1996
INVENTOR(S) : Wayne L. Dohnal

It is certified that error appears in the above-indentified patent and that said Letters Patent is hereby corrected as shown below:

In column 11 at line 41 delete "38." and insert --438.--

In column 15 in Table C at line 59 delete "Expanded" and insert --Expanded Elite--

Signed and Sealed this

Fourth Day of March, 1997

Attest:

BRUCE LEHMAN

Attesting Officer

Commissioner of Patents and Trademarks